United States Patent
Tsoffka

[11] Patent Number: 5,585,680
[45] Date of Patent: Dec. 17, 1996

[54] ELECTROMAGNETIC STEPPER MOTOR

[76] Inventor: Vladimir Tsoffka, 1225 Brighton 15th, Brooklyn, N.Y. 11732

[21] Appl. No.: 441,720

[22] Filed: Apr. 12, 1995

[51] Int. Cl.$^6$ ............ H02K 21/26; H02K 1/00; H02K 37/00
[52] U.S. Cl. ............ 310/49 R; 310/181; 310/154
[58] Field of Search ............ 310/49 R, 154, 310/180, 181, 265

[56] References Cited

U.S. PATENT DOCUMENTS

| | | | |
|---|---|---|---|
| 3,610,974 | 1/1970 | Kenyon | 310/49 R |
| 4,217,513 | 10/1977 | Kohzai et al. | 310/186 |
| 4,571,528 | 2/1986 | McGee et al. | 318/138 |
| 4,999,559 | 3/1991 | Katz | 318/696 |
| 5,015,903 | 5/1991 | Hancock et al. | 310/168 |
| 5,345,131 | 9/1994 | Torok | 310/181 |
| 5,448,117 | 9/1995 | Elliott | 310/49 R |

*Primary Examiner*—Thomas M. Dougherty
*Assistant Examiner*—Michael Wallace, Jr.
*Attorney, Agent, or Firm*—Ilya Zborovsky

[57] ABSTRACT

An electromagnetic stepper motor has a drum-type rotor rotatable about an axis and provided with a plurality of permanent magnets distributed over its circumference, a stator surrounding the rotor and comprising a plurality of permanent magnets and an electromagnet provided on each of the permanent magnets of the stator and connectable with a commutator, wherein each of the electromagnets including a plurality of electromagnet members located one after the other in a circumferential direction so that during an interaction of the permanent magnets of the rotor and the electromagnets of the stator the electromagnet members are switched on one after the other.

2 Claims, 1 Drawing Sheet

ELECTROMAGNETIC STEPPER MOTOR

BACKGROUND OF THE INVENTION

The present invention relates to electromagnetic stepper motors.

More particularly, it relates to electromagnetic stepper motors having a drum-type rotor with permanent magnets and a stator with permanent magnets facing the permanent magnets of the rotor, wherein the permanent magnets of the stator are provided with electromagnets connected with the current supply distributor. Such electromagnetic motor is disclosed for example in the Inventor Certificate of the Soviet Union No. 1,755,721. In this reference each of the electromagnets is equal in size to the permanent magnets of the rotor. The number of permanent magnets of the rotor exceeds the number of permanent magnets of the stator by one unit.

It is believed that the above described electromagnetic motor can be further improved.

SUMMARY OF THE INVENTION

Accordingly, it is an object of the present invention to provide an electromagnetic stepper motor which is a further improvement of the known electromagnetic stepper motor.

In keeping with these objects and with others which will become apparent hereinafter, one feature of the present invention resides, briefly stated, in an electromagnetic stepper motor having a stator provided with permanent magnets, a rotor provided with permanent magnets, and a plurality of electric magnets attached to said permanent magnets of said stator, wherein each electromagnet of each permanent magnet of the stator is composed of three individual electromagnets located one after the other in a circumferential direction.

When the electromagnetic motor is designed in accordance with the present invention, the characteristics of the electromagnetic motor are substantially improved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
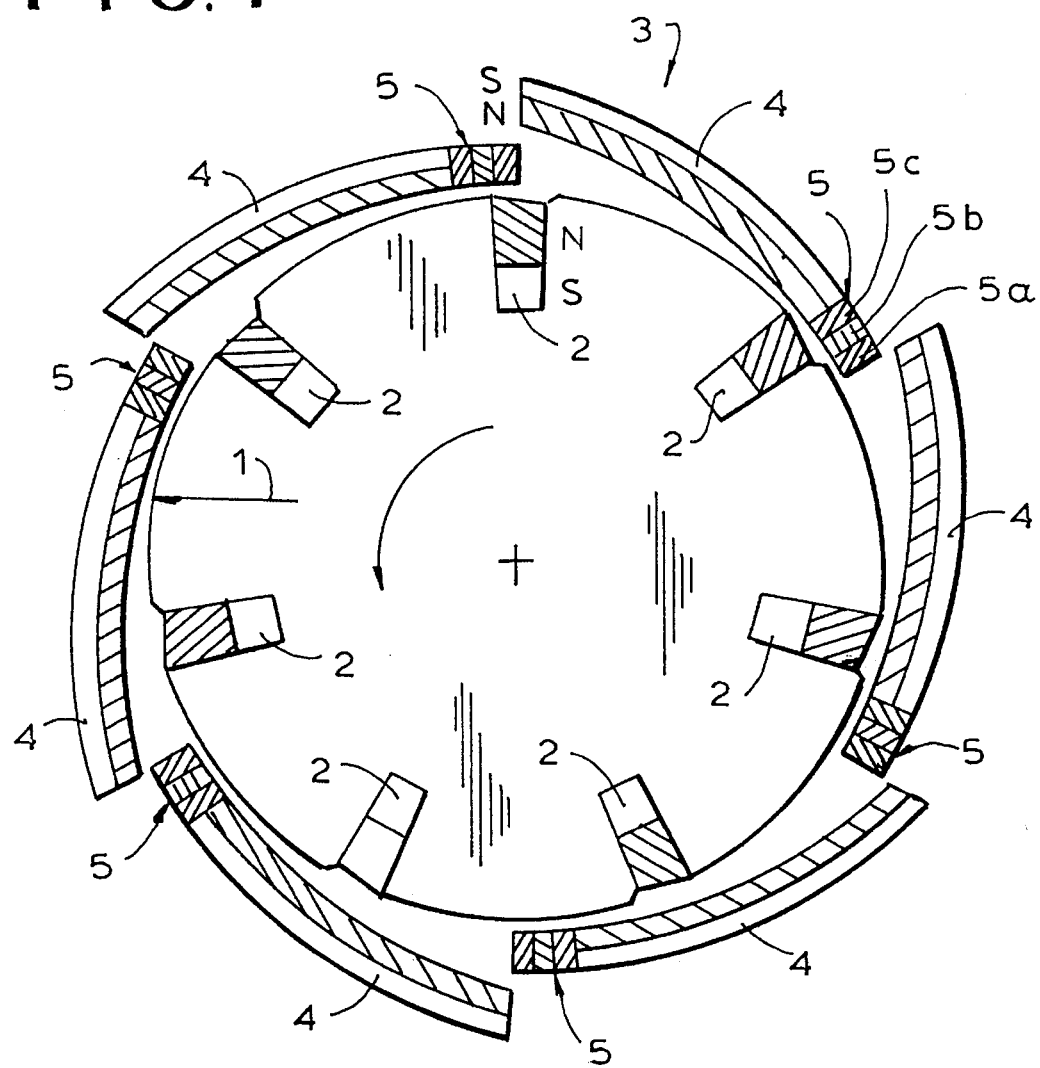
FIG. 1 is a view schematically showing a section of an electromagnetic motor in accordance with the present invention.
Figure 2:
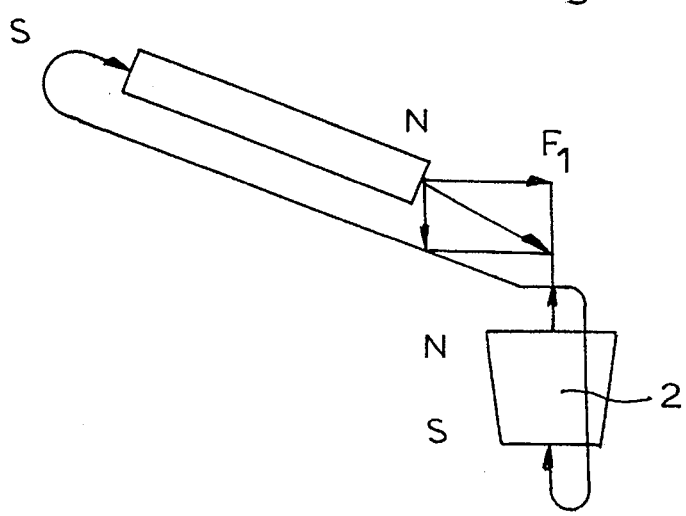
FIG. 2 is a view showing a diagram of interaction of magnetic fields of a stator and a rotor of the inventive electromagnetic motor.

An electromagnetic stepper motor in accordance with the present invention has a drum-type rotor 1 provided with a plurality of permanent magnets 2 which are uniformly spaced from one another in a circumferential direction. The electromagnetic motor in accordance with the present invention further has a stator which is identified with reference numeral 3 and surrounds the rotor 1. The stator 3 has a plurality of permanent magnets 4 extending substantially in a circumferential direction. The permanent magnets 4 of the stator 3 are each located at a non-uniform distance from the rotor. For example, the stator 3 can have six permanent magnets 4, and a gap between each permanent magnet of the stator 3 and the outer surface of the rotor 1 can vary from 0.1 mm on the one end and 5 mm on the other end of each permanent magnet of the rotor.

A plurality of electromagnets 5 are located between the end faces of the permanent magnets 4 of the stator 3 and a not shown current supply distributor connected with each of the electromagnets. Each electromagnet 5 has a size corresponding to the size of the permanent magnets 2 of the rotor 1. The number of the permanent magnets of the rotor 1 exceeds the number of the permanent magnets of the stator 3 by one, and their size expressed in degrees of a sector can be found by the ratio:

$$360°/N - 360°/N+1 = \text{optimal value},$$

wherein N is a number of the permanent magnets of the stator.

As can be seen from the drawings, each electromagnet 5 is composed of several electromagnets, for example of three electromagnets 5a, 5b, 5c. There can be more than three electromagnets in each electromagnet 5. The electromagnets 5a, 5b, 5c can be of equal size or a different size.

The electromagnetic motor in accordance with the present invention operates in the following manner:

The electromagnets 5 of the stator 3 switch on at the moment when the permanent magnet 2 of the rotor 1 is exactly opposite to it. At that moment the rotation pulse is created. The electromagnets 5 remains switched unless the permanent magnet 2 enters the zone of interaction with the respective permanent magnet of the stator 3 and starts to be pushed off by it in the direction of rotation. During the interaction of the permanent magnets of the rotor with the electromagnets of the stator, the electromagnets 5a, 5b, 5c are turned on successively one after the other. The next permanent magnet 2 of the rotor 1 now enters the zone of interaction with the electromagnets 5 of the stator 3 and the cycle repeats again. Because of the special number ratio of the permanent magnets of the stator 1 and the rotor 3, one of the permanent magnets of the rotor 1 will always be present in the zone of interaction with the electromagnets 5. The main feature of the operation of the electromagnetic stator in accordance with the present invention is a strict turn-by-turn coming into interaction with the electromagnets 5 of the stator 3. The next permanent magnet of the rotor 1 accordingly will enter the zone of interaction with the electromagnets of the stator of the permanent magnets.

The number of the electromagnets 5a, 5b, 5c, etc. in each group 5 of the electromagnets of the stator 3, can be one, two, three and more. They can be of equal size or of different size.

All permanent magnets 2 of the rotor 1 which are not in contact with the corresponding electromagnets 5a, 5b, 5c of the group 5 of the stator 3 are pushed off from the permanent magnets of the stator 3 in the direction of the arrow so as to create an additional power for rotation of the stator. Thus, the operation of the electromagnetic motor in accordance with the present invention is based on the closed circuit turn-by-turn interaction of the permanent magnets of the rotor with the electromagnets and the permanent magnets of the stator.

The electromagnetic motor in accordance with the present invention has very low energy consumption, the potential energy of the permanent magnets is fully used; and this achieves the objects of the present invention. Also, the electromagnetic motor in accordance with the present invention has a high stability of rotation speed, easy and precise adjustment of the rotation speed, high efficiency, and high power coefficient which makes the motor useable in all fields of science and technology and particularly in electromobiles as highly economical and ecologically clean engines. It outperforms all other electromagnetic motors.

It will be understood that each of the elements described above, or two or more together, may also find a useful application in other types of constructions differing from the types described above.

While the invention has been illustrated and described as embodied in an electromagnetic stepper motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic motor, comprising a rotor rotatable about a rotary axis and having a plurality of permanent magnets arranged on a periphery of said rotor at circumferential distances from one another; and a stator radially outwardly surrounding said rotor and including a plurality of separate permanent magnets spaced from one another in a circumferential direction, each of said permanent magnets of said stator having two ends spaced from one another in a circumferential direction and being provided with an electromagnet stationarily arranged on one of said ends so that when one of said permanent magnets of said rotor reaches a respective one of said electromagnets, said respective one of said electromagnets gives a rotation pulse to said one permanent magnet of said rotor, and then when said one permanent magnet of said rotor rotates further to a permanent magnet of said stator associated with said respective one of said electromagnets, said permanent magnet of said rotor pushes off said permanent magnet of said rotor, each of said electromagnets including a plurality of electromagnet members arranged near one another in circumferential direction and switchable successively one after the other so that when one of said permanent magnets of said rotor reaches said respective one of said electromagnets, first one of said electromagnet members of said electromagnet provides the rotation pulse, and thereafter a next one of said electromagnet members provides the rotation pulse.

2. An electromagnetic motor, comprising a rotor rotatable about a rotary axis and having a plurality of permanent magnets arranged on a periphery of said rotor at circumferential distances from one another; and a stator radially outwardly surrounding said rotor and including a plurality of separate permanent magnets spaced from one another in a circumferential direction, each of said permanent magnets of said stator having two ends spaced from one another in a circumferential direction and being provided with an electromagnet stationarily arranged on one of said ends so that when one of said permanent magnets of said rotor reaches a respective one of said electromagnets, said respective one of said electromagnets gives a rotation pulse to said one permanent magnet of said rotor, and then when said one permanent magnet of said rotor rotates further to a permanent magnet of said stator associated with said respective one of said electromagnets, said permanent magnet of said rotor pushes off said permanent magnet of said rotor, each of said electromagnets including a plurality of electromagnet members arranged near one another in circumferential direction and switchable successively one after the other so that when one of said permanent magnets of said rotor reaches said respective one of said electromagnets, first one of said electromagnet members of said electromagnet provides the rotation pulse, and thereafter a next one of said electromagnet members provides the rotation pulse, each of said electromagnets having a width as considered in the circumferential direction which corresponds to a width of each of said permanent magnets of said rotor, so that each of said electromagnet members has a width in the circumferential direction which is a fraction of the width of each of the permanent magnets of said rotor.

* * * * *